United States Patent [19]

Allen

[11] 3,968,408

[45] July 6, 1976

[54] NEUTRALIZING TRANSFORMER

[76] Inventor: Gordon Y. R. Allen, 4 Ireland Court, Islington, Ontario, Canada

[22] Filed: Oct. 2, 1974

[21] Appl. No.: 511,361

[52] U.S. Cl. .................................... 317/17; 317/45; 323/48; 336/84; 336/221

[51] Int. Cl.[2] ........................................ H02H 3/20

[58] Field of Search .................. 317/17, 45; 336/69, 336/84, 221, 205, 206, 70, 61, 195; 323/48

[56] References Cited

UNITED STATES PATENTS

| | | | |
|---|---|---|---|
| 2,008,859 | 7/1935 | Ganz | 336/84 X |
| 2,592,817 | 4/1952 | McKechie | 336/61 |
| 3,086,184 | 4/1963 | Nichols | 336/206 X |
| 3,102,245 | 8/1963 | Lawson, Jr. | 336/205 X |
| 3,197,723 | 7/1965 | Dortort | 336/195 |
| 3,453,494 | 7/1969 | Allen | 317/17 |
| 3,638,155 | 1/1972 | Combs | 336/69 |

*Primary Examiner*—R. Skudy
*Assistant Examiner*—Patrick R. Salce
*Attorney, Agent, or Firm*—Edwin E. Greigg

[57] ABSTRACT

A neutralizing transformer comprising a flat ribbon-like conductor cable having a plurality of flexible conductors, either flat or round, encapsulated in insulation with a flexible conductor shield or ground plane coextensive with the width of the cable, said transformer being formed by coiling such flexible ribbon-like conductor cable and utilizing the shield as the transformer primary with the flexible conductors as the secondaries. The secondaries may be connected in various ways to reduce the mutual capacitance between the conductors while at the same time maintaining a high dielectric withstand capability between the conductors.

3 Claims, 7 Drawing Figures

NEUTRALIZING TRANSFORMER

BACKGROUND OF THE INVENTION

This invention relates to neutralizing transformers useful in electric power transmission systems which depends upon communication facilities to effect proper operation and control. These transformers are used to neutralize the effect of ground potential changes and longitudinally induced voltages due to the proximity to power lines on communication lines which enter the power sub-stations.

Up to the present time, multi-wound or multi-circuit neutralizing transformers have utilized telephone type cable for the secondary or signal windings. Essentially, the cable consists of a given number of balanced twisted pairs formed or cabled into a standard telephone type cable configuration. An example of such neutralizing transformers utilizing twisted pairs is shown in the U.S. Pat. to GORDON Y. R. ALLEN, No. 3,453,494, entitled NEUTRALIZING TRANSFORMERS, granted July 1, 1969. In this patent, the twisted pairs were wound around a core and connected in such a manner that the shield of the twisted pairs acted as a primary in the transformer and, as disclosed in this patent, this primary winding was connected to ground.

Another form of neutralizing transformer has been to utilize a primary winding wound in bifilar configuration with the secondary or signal winding.

Still another alternative is the use of an external shield around the coil as the primary winding.

In any of these configurations a mutual capacitance between conductors and the capacitance of conductor to ground has been very high. Furthermore, the winding space factor caused by the twisted pairs has been very poor and led to an unacceptable size. In order, however, to attempt to reduce the winding space, it has been necessary to reduce the waste space caused by the use of the twisted pairs. This in the past has normally meant a reduction in the dimensions of the dielectric and an increase in the mutual capacitance. In other words, there was a tradeoff of alternatives — space or capacitance, and these alternatives have heretofore been unacceptable.

Accordingly, it is a first object of this invention to provide a neutralizing transformer which overcomes all the deficiencies of the prior art transformers and this is accomplished as will be understood from the following.

SUMMARY OF THE INVENTION

A neutralizing transformer constructed in accordance with the teachings of this invention will comprise the use of shielded flat conductor cable or conductor ribbon wound in a coil form wherein the shield functions as the primary winding and the flat conductors function as the secondaries of the transformer. This affords a large reduction in coil winding space requirements, thus reducing total core mass and/or coil length, thus reducing given magnetizing or exciting current, thus reducing the size, weight and cost of the transformer and, more particularly, under a given set of circumstances, reducing the remnant or un-neutralizing voltage, all the while maintaining a high dielectric withstand capability.

Accordingly, it is a primary object of this invention to provide a neutralizing transformer made from shielded flat flexible conductor cable in which the shield becomes the primary and the conductors become the secondaries of the transformer.

Another object of this invention is to provide a neutralizing transformer of reduced size and cost yet with reduced mutual capacitance between the conductors while maintaining high dielectric capability.

Other additional objects will become apparent to those skilled in the art after having read the following drawings and specification which form a part hereof.

BRIEF DESCRIPTION OF THE PREFERRED EMBODIMENT

Figure 1:
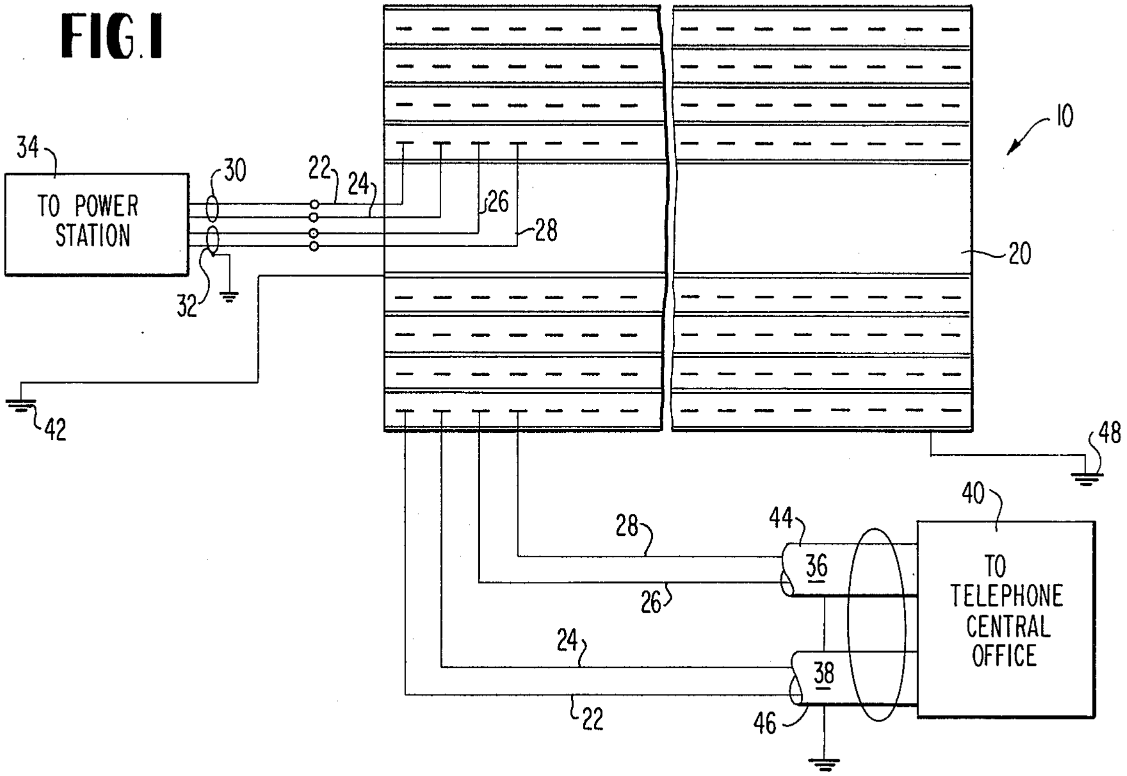
FIG. 1 shows a neutralizing transformer formed of shielded flat cables wound around a core with the shield as the primary and the secondaries all connected in a manner shown in the Allen U.S. Pat. No. 3,453,494 supra.
Figure 2:
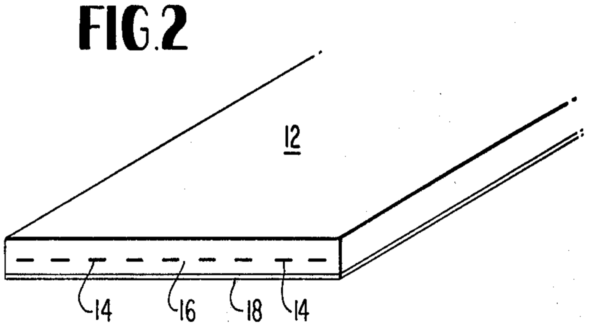
FIGS. 2 and 3 show a flat flexible conductor cable of two forms with attached ground plane or shield before being wound into the neutralizing transformer configuration.
Figure 3:
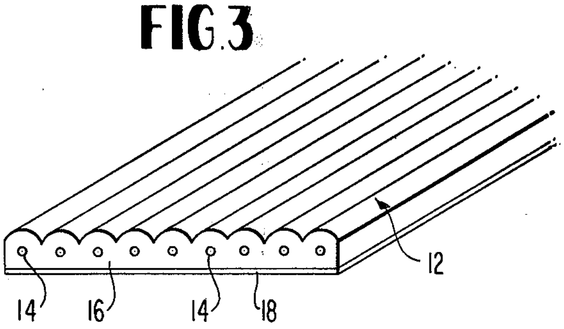

Turning now to FIGS. 1, 2 and 3, there is shown a neutralizing transformer 10 formed in accordance with the teachings of the present invention. FIGS. 2 and 3 show flat flexible cables 12 of conventional types comprising a plurality of flat or round flexible conductors 14 embedded in a suitable dielectric 16 and provided with a ground plane or shield 18 which extends the width of the cable as shown. This ribbon-like flexible cable is available commercially from a number of sources and therefore need not be described further.

FIG. 1 shows a neutralizing transformer 10 formed by coiling the flexible ribbon-like shielded cable 12 such as shown in FIG. 2 around a steel core 20. The leads to the transformer are shown connected in pairs 22, 24, and 26, 28 to terminals which are then connected through shielded cables comprising twisted pairs 30, 32 which, in turn, are connected to a frequency source 34. Similarly, the outputs from the transformer are connected to a pair of shielded cables 36 and 38 which, in turn, are connected to a frequency receiver 40. The input of shield 18 is shown connected to a first ground 42 with the output connected to the shields 44, 46 on the flexible cables and to a second ground 48 which is remote from the first ground 42, all in accordance with the teachings of the Allen U.S. Pat. No. 3,453,494, supra. Since this arrangement of the neutralizing transformer of this invention, as connected into an environmental configuration, is more fully explained in the Allen patent supra, no further description is deemed necessary herein.

Figure 4:
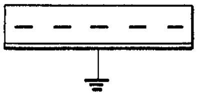
FIGS. 4, 5, 6 and 7 show various ways in which the secondaries may be connected to reduce the mutual capacitance and to provide shielding between the windings where desirable.
Figure 5:
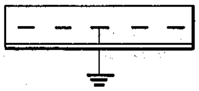
Figure 6:
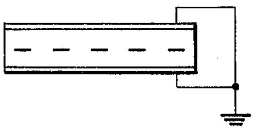
Figure 7:

It is to be noted that the flexible ribbon-like cable as shown in FIGS. 2 and 3 wound around a core takes advantage of the shielded ground plane 18 and to utilize this shielded cable as the primary in the neutralizing transformer. This concept is unique and not found in the prior art. Once having understood the inventive concept disclosed herein, many variations can be utilized. For example, attention is now directed to FIGS. 4–7 wherein FIG. 4 shows a flat cable connected directly to ground with a given mutual capacitance between conductors depending upon the dielectric, the distance between the conductors, and the size of the conductors measured in pfd/linft, whereas, with the double ground shield as shown in FIG. 6, the mutual capacitance is reduced by 10% of the capacitance of the embodiment of FIG. 4. FIGS. 5 and 7 show additional ways of connecting the conductors and the shield for selected reduction of capacitance. Note also that FIG. 5 shows a conductor connected in parallel to ground and to the shield to isolate the conductors on either side thereof. Each of the arrangements having a double ground shield, FIGS. 6 and 7, however, requires an additional layer of non-conductive material over the shield to prevent shorting of the shield when wound as a transformer. Thus, numerous combinations can be made utilizing the inventive concept depending upon the desired results.

What is claimed is:

1. A neutralizing transformer comprising:

a plurality of conductors embedded in a dielectric and forming a flat ribbon-like cable, a flexible conductor shield coextensive with the width and length of said cable, said cable and shield being wound around a core to form a transformer, said shield forming the primary winding and the plurality of conductors forming the secondary windings, and said primary winding coupled between two spaced-apart grounds whereas said secondary windings are individually coupled to a plurality of frequency sources and frequency receivers.

2. The neutralizing transformer as claimed in claim 1 wherein said conductors are selectively coupled to the shield to reduce capacitance between these conductors.

3. The neutralizing transformer as claimed in claim 1 wherein said secondary conductors are connected in pairs to pairs of input conductors from a frequency source and wherein said pairs are separated by a conductor connected to said shield to magnetically separate adjacent pairs.

* * * * *